United States Patent Office 3,381,055
Patented Apr. 30, 1968

3,381,055
THERMALLY STABLE AND THERMALLY FLEXIBLE THERMOSETTING RESIN COMPOSITION
John R. Le Blanc, Wilbraham, and Joel Fantl, Springfield, Mass., Stuart H. Rider, Kirkwood, Mo., and Frank S. O'Connell, South Hadley, Mass., assignors to Monsanto Company, St. Louis, Mo., a corporation of Delaware
No Drawing. Continuation-in-part of application Ser. No. 335,359, Jan. 2, 1964. This application July 3, 1967, Ser. No. 650,638
24 Claims. (Cl. 260—848)

ABSTRACT OF THE DISCLOSURE

Resin products having excellent thermal flexibility and thermal stability employing as starting compositions a mixture of a thermosetting phenol-formaldehyde reaction product and an interpolymer of vinylidene monomer/maleic monomer/terpene monomer which mixture cures to produce the desired resin products.

---

This application is a continuation-in-part of our earlier U.S. application, Ser. No. 335,359 filed Jan. 2, 1964, now abandoned.

Generally, thermosetting resins, particularly the phenol-formaldehyde type, are well-known in the art for use in many industrial applications. They are characteristically very rigid, and when subjected to high temperatures, i.e., in the range of about 200 to 300° C., they still retain their rigidity. In fact, thermosetting resins of the phenol-formaldehyde type generally retain their rigidity up to the time they are completely consumed by exposure to higher temperatures, such as about 500° C. and greater. In addition, it has been observed that phenol-formaldehyde resins apparently undergo a weight transition or a weight loss while being subjected to such high temperatures of 200 to 300° C. This has a serious drawback when using a phenol-formaldehyde resin for coating applications, particularly when such coatings are exposed to temperatures of 260° C. and higher. Therefore, the resin industry needs a phenol-formaldehyde resin system having both a minimum amount of weight loss when subjected to higher temperatures and also a certain degree of flexibility at such higher temperatures.

Mixtures of phenol-formaldehyde reaction products with styrene/maleic anhydride copolymer have heretofore been proposed (see Powers et al. U.S. Patent No. 2,469,408). However, such prior art compositions suffer from the serious disadvantage that they cannot be prepared in the form of heat curable, aqueous liquid resin concentrates containing relatively high weight percentages of each component. This circumstance is probably accounted for by the fact that the styrene/maleic anhydride copolymer used by Powers et al. (op. cit.) is only relatively slightly soluble in water. Thus, only heat curable aqueous liquid resin concentrates containing a very low amount of styrene/maleic anhydride copolymer could be prepared by Powers et al. A large amount of water in a heat curable liquid phenol-formaldehyde resin system, as is obvious to those skilled in the art, make such resin system of little or no practical value for use in the manufacture of, for example, molding compounds, and the like, owing to problems of disposing of the water.

It has now been discovered that a heat-curable composition containing both a phenol-formaldehyde reaction product and a terpene monomer-modified vinylidene monomer/maleic monomer interpolymer not only has excellent thermal flexibility and thermal stability when heat cured but also is preparable in the form of heat curable aqueous liquid resin concentrates containing relatively high weight percentages of each respective component dissolved therein. These features give such compositions unexpected superiority over, and overcome the disadvantages of, prior art resin systems.

This invention is directed to novel heat curable resin compositions containing in admixture from about 98 to 2 weight percent of a phenol-formaldehyde thermosetting reaction product, and correspondingly, from about 2 to 98 weight percent of a vinylidene monomer/maleic monomer/terpene monomer interpolyer. When such a composition is heated, the phenol-formaldehyde condensate and the indicated interpolymer react to form a novel cured thermoset resin product having excellent thermal stability and thermal flexibility.

In preferred compositions of this invention, the range of ingredients is from about 95 to 35 weight percent, and more specifically from about 60 to 40 weight percent, of the phenol-formaldehyde reaction product, and, correspondingly, from about 5 to 65 weight percent and more specifically from about 40 to 60 weight percent of the indicated interpolymer. As shown in the examples (below), it has been surprisingly discovered that, by employing increasing amounts of this interpolymer with the thermosetting resin in these compositions, the cured thermoset resin products produced therefrom tend to have increased thermal stability and increased thermal flexibility when advanced to the infusible (cured) state. The respective amounts of each type of ingredient employed in any given composition is chosen so as to produce the desired thermal stability and thermal flexibility.

The phenol-formaldehyde reaction product employed in the practce of this invention can be any phenol-formaldehyde resin. Preferably, it is the reaction product of from about 0.5 to 3.5 mols of formaldehyde per mol of phenol under alkaline or acidic conditions. When reacting less than about 1 mol of formaldehyde per mol of phenol, a novolac resin is prepared which requires the further addition of a crosslinking agent, such as hexamethylenetetraamine, to cause the resin to advance to the infusible state when exposed to elevated temperatures. This is commonly known as a two-stage resin. When reacting one or more mols of formaldehyde per mol of phenol, the reaction product is known as a one-stage resin and does not require addition of a crosslinking agent. The resin may be recovered in either a water system, a water-organic solvent system, or a straight organic solvent system. The preferred phenol-formaldehyde resin to be employed in the practice of this invention is a phenol-formaldehyde resin prepared by reacting about 1.0 to 3.5 mols of formaldehyde per mol of phenol under alkaline conditions and wherein the resin is recovered in a water system.

Optionally, and preferably, phenol-formaldehyde reaction product employed is one which is modified with dicyandiamide, or urea, or a mixture of dicyandiamide and urea, in accordance with the teachings of U.S. Patent No. 3,004,941 to Mestdagh et al. which are incorporated herein by reference. When using such a modified phenol-formaldehyde reaction product, preferentially the phenol-formaldehyde resin is first prepared by reacting the phenol and an excess of formaldehyde in the presence of an alkaline catalyst to a predetermined free formaldehyde content as determined by the hydroxylamine-hydrochloride test. The reaction product so prepared is cooled to about 30 to 50° C. The dicyandiamide, or urea, or mixture of dicyandiamide and urea, is then added in such a proportion that the ratio is generally about 1 mol of the additives to 0.5 to 2.0 mols of formaldehyde, and, preferably, 1.2 to 1.6 mols of formaldehyde. When employing a mixture of dicyandiamide and urea, the mixture can consist of from about 10 to 90 weight of dicyanadiamide and, correspondingly, about 90 to 10 weight percent of urea.

Preferably, such mixture consists of at least about 65 weight percent of dicyandiamide with the balance being urea.

Alternatively, the process for preparing the above mixture may be accomplished by reacting the dicyandiamide or urea or mixture of the dicyandiamide and urea with formaldehyde in the presence of an alkaline catalyzed reaction produce of phenol-formaldehyde having no excess free formaldehyde, which process can be initiated by first reacting phenol with formaldehyde under alkaline catalyzed conditions to provide a water-dilutable condensate of phenol-formaldehyde having no free formaldehyde.

As indicated previously, the interpolymer employed in the instant invention is a terpene monomer modified polymerization product of a maleic monomer and a vinylidene monomer. Generally, the monomers are reacted or interpolymerized by a mass polymerization process and at a temperature of at least about 100° C. In such a process a free radical generating polymerization initiator is generally employed. Preferentially, the reaction process is carried out at a reaction rate not greater than about 5 times the rate at which the added vinylidene monomer is being polymerized. That is, maleic monomer is first charged to the reaction kettle, and vinylidene monomer is added thereto at the rate specified previously. In another method, vinylidene monomer is added to the reaction kettle at a rate substantially equal to the rate at which added vinylidene monomer is being polymerized.

The free radical generating polymerization initiator is generally present in the polymerization reaction in the amount of at least about 0.5 weight percent, and, preferably, about 0.5 to 2.0 weight percent, and more specifically about .7 to 1 weight percent based upon the weight of the vinylidene monomer that is being added to the system. Examples of the free radical generating polymerization initiators which may be employed include benzoyl peroxide, ditertiary butyl peroxide, tertiary butyl hydroperoxide, lauroyl peroxide, tertiary butyl perbenzoate, tertiary butyl peracetate, azoisobutyronitrile, cumene hydroperoxide, and the like.

Reaction between vinylidene momomer and maleic monomer is carried out in the presence of terpene monomer as a molecular rate regulator. Such regulator is present in a reaction mixture in the amount of at least about 0.5 weight percent, and, preferably, in the amount of from about 0.5 to 30 weight percent, and, more especially, about 5 to 20 weight percent, based upon the total weight of vinylidene monomer used in making an interpolymer.

A free radical generating polymerization initiator and a molecular weight regulator may be initially charged to the reaction with the maleic monomer, may be added to the polymerization with the vinylidene monomer, or may be split therebetween. Preferably, a substantial portion, and optionally all, of the molecular weight regulator required in the reaction is charged with the maleic monomer and the free radical generating polymerization initiator is charged to the polymerization reaction with the vinylidene monomer.

The molecular weight regulators (termed terpene monomers herein) employed in making the interpolymers used in this invention characteristically contain olefinic unsaturation. It is believed that the molecular weight regulator actually interpolymerizes with the maleic monomer and/or the vinylidene monomer, as demonstrated by the observation that the polymeric products obtained by the process of the invention are completely soluble in aqueous ammonia. If any substantial quantity of the molecular weight regulator were present in a free-form, it would be insoluble in the aqueous ammonia. Thus, the polymeric products obtained by the process of the invention must be either terpolymers of the maleic monomer, the vinylidene monomer and the molecular weight regulator, or a blend of (1) an interpolymer of the maleic monomer and the vinylidene monomer and (2) an interpolymer of the maleic monomer and the molecular weight regulator, or both. An additional component of the polymeric product may possibly be an adduct formed between the maleic monomer and the molecular weight regulator. Formulae I and II below illustrate the most probably structures of such adducts when the molecular weight regulator is terpinolene:

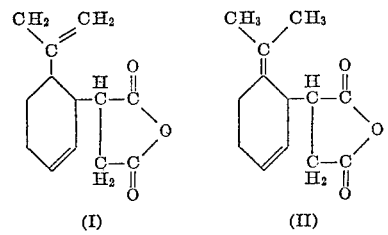

The terpene monomer molecular weight regulators employed in making the interpolymers used in this invention can be said generally to conform to the formula:

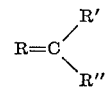

wherein R is a cyclic organic radical to which =CR'R'' is joined at a carbon atom of an alicyclic ring having at least 4 members, and wherein R' and R'' are independently selected from the group consisting of hydrogen and an alkyl radical.

Exemplary of utilizable molecular weight regulators are methylene cyclobutane, methylene cyclopentane, caryophyllene, pulegone, terpinolene, beta-terpinene, pseudolimonene, beta-phellandrene, 1(7), 4(8)-p-menthadiene, 2,4(8)-p-menthadiene, sabinene, betapinene, camphene, alpha-fenchene, beta-fenchene and mixtures thereof, as well as many other compounds which satisfy the requirement of corresponding to the above formula, especially the compounds wherein R' and R'' of the formula represent hydrogen or a methyl group.

The preferred molecular weight regulators are cyclic terpenes which contain a 6-membered alicyclic ring, monocyclic terpenes being especially preferred. Although such cyclic terpenes can advantageously be employed in the form of commercial terpene mixtures, it is usually preferred to avoid using commercial terpene mixtures wherein the molecular weight regulator of the invention is contaminated by any substantial amount of impurities other then unsaturated cyclic terpenes. Other impurities can be present without destroying the effectiveness of the molecular weight regulator, but they may cause undesirable effects, such as foam. If desired, other types of molecular weight regulators such as beta-nitrostyrene and mercaptans can be used in conjuction with the primary molecular weight regulators.

The maleic monomers employed in the practice of the invention are selected from the group consisting of maleic anhydride, maleic acid and half esters of maleic acid and a 1–18 carbon atom monohydric alcohol and mixtures thereof. Typical examples of such monomers, in addition to maleic anhydride and maleic acid, include methyl acid maleate, secondary butyl acid maleate, butyl cellosolve acid maleate, 2-ethylhexyl acid maleate, octadecyl acid maleate, etc. In one embodiment of the invention, the maleic monomer polymerized will consist of a mixture of methyl acid maleate and secondary butyl acid maleate in which the secondary butyl acid maleate constitutes in excess of 50 weight percent of the mixture.

The vinylidene monomers employed in the interpolymer used in this invention are any of the vinylidene monomers which polymerize with maleic monomers of the type described in the paragraph above. Typical vinylidene monomers that can be employed include vinyl esters of organic and inorganic acids, such as vinyl acetate, vinyl stearate, vinyl chloride; vinylidene aromatic compounds, such as styrene, vinyl naphthalene, and the ring-alkyl and ring-halogen substituted derivatives thereof, e.g., vinyl toluene, vinyl xylene, 2,4-dimethylstyrene, chlorostyrene, 2,5-dichlorostyrene, 2-methyl-4-chlorostyrene, etc.; vinyl alkyl ethers, such as vinyl methyl ether, vinyl isobutyl ether, etc.; vinylidene heterocyclic compounds, such as vinyl pyridine, etc.; and mixtures of two or more of said vinylidene monomers. When the vinylidene monomer employed has an atmospheric boiling point of less than 100° C., it is obvious that the reaction is run in a sealed pressure-resistant autoclave.

The maleic monomer and the vinylidene monomer will be employed in the weight ratio of from about 1 to 2, and, preferably, from about 1 to 1.5 molar portions of vinylidene (or styrene) monomer per molar portion of maleic monomer. In a preferred embodiment of the invention, the vinylidene monomer (e.g., styrene monomer) and the maleic monomer (e.g., maleic anhydride) are employed in essentially equimolar ratio.

Depending upon the reaction temperature, the concentration of the free radical generating polymerization initiator, and the concentration of the molecular weight regulator, the resulting interpolymers have a number average molecular weight of less than about 10,000, and, in some cases, molecular weights are as low as about 1,000 or even slightly less.

When employing the interpolymer of this invention with the thermosetting reaction product, it may be desirable to first prepare a soluble salt of the interpolymer, particularly when the interpolymer is employed with an aqueous thermosetting reaction product. Any salt of the interpolymer can be employed providing that the particular salt does not have a detrimental effect upon the cured resin composition. However, particularly useful are the ammonium and substituted ammonium salts of the interpolymer, such as the mono-, di- and tri-ethanol amine salts of the interpolymer. Also useful are the alkali metal salts of the interpolymer. It is preferable in a preferred embodiment of this invention to use an ammonium salt of the interpolymer when employing an aqueous thermosetting reaction product.

It is preferred to prepare compositions of the invention in the form of heat curable, aqueous liquid resin concentrates containing, in solution, relatively high weight percentages of either or both the phenol-formaldehyde reaction product or the terpene modified styrene/maleic anhydride interpolymer. In such liquid concentrates, the combined weight of such mixture of phenol-formaldehyde reaction product and interpolymer is at least about 25 weight percent (based on total concentrate weight).

The upper limit on such total combined weight is dependent upon viscosity of the concentrate. Thus, in general, such total combined weight is not more than that which leaves the resulting concentrate in a free-flowing state (e.g., a concentrate is pourable from a wide-mouth vessel at room temperatures and pressures). Thus, depending upon the particular phenol-formaldehyde reaction product used, the particular interpolymer used, and the particular liquid carrier (solvent) used, such total combined weight can range up to about 80 to 85 weight percent or even higher. A preferred range for such total combined weight is from about 30 to 68 weight percent.

In such liquid concentrates, the relative proportions of phenol-formaldehyde reaction product and interpolymer remain as indicated above; that is, the weight percent of phenol-formaldehyde ranges from about 98 to 2 while, correspondingly, the weight percent of interpolymer ranges from about 2 to 98, based on total combined mixture weight in such liquid concentrate.

The liquid carrier employed in such concentrate compositions is preferably chosen so as to be substantially inert towards composition components and cured products produced therefrom, and can be aqueous or organic. Suitable organic liquids include lower alkanols, such as ethanol (preferred), isopropanol, or the like; aliphatic hydrocarbons such as heptane, and the like; aromatic hydrocarbons such as benzene, toluene, xylene, naphthalene, and the like; chlorinated hydrocarbons, such as dichlorobenzene, dichloromethyl benzene, and the like; heterocyclics, such as pyridine, morpholine, and the like; lower ethers, such as methyl ethyl ether, and the like; lower ketones, such as acetone, and the like; lower esters, such as methyl acetate, and the like, etc.

In preparing these liquid concentrates, it is convenient to first make the phenol-formaldehyde reaction product and the interpolymer separately and then to combine them into a common liquid carrier. Since phenol-formaldehyde reaction products are commonly prepared under aqueous phase conditions, it is convenient, when preparing aqueous concentrates, to dissolve or mix an interpolymer with a phenol-formaldehyde aqueous solution. The interpolymer can be previously dissolved or not, as desired.

If the phenol-formaldehyde reaction product is prepared in aqueous liquid phase, it can be placed in organic liquid phase by evaporating the aqueous liquid phase to dryness (taking care not to crosslink such product through excessive heating in the process). The dry product is then pulverized or ground into a powder (to facilitate dissolution) and then dissolved in the organic liquid carrier chosen. Similar processing techniques can be used for the interpolymer. In general, conventional methods are used for the preparation of the liquid concentrates of this invention.

In practice and commercially, these liquid concentrates are used conventionally. Thus, typical use conditions involve the removal of the liquid carrier, as by evaporation, and then, as when a molded product is being prepared, grinding the dried material to a powder. This resin powder is then pressed into a desired configuration and heated to cross-link (cure) the resin. Other processing methods may be used as those of ordinary skill in the art fully appreciate.

As indicated above, when a resin composition of the invention is advanced to an infusible state (e.g., is cured or crosslinked), it has excellent thermal stability and excellent thermal flexibility. When the resin composition is advanced to the infusible state under the influence of heat, the thermosetting reaction product and the interpolymer actually react together. It is believed that the interpolymer reacts with the benzylic hydroxyl groups of the phenolic resin to form the ester between the crosslinked phenol-formaldehyde resin. It is this reaction of the two materials that provides for the excellent thermal flexibility and excellent thermal stability of the resin product after it is advanced to the infusible state.

The resins of this invention are used in such applications as bonding of thermal insulation wherein thermal stability affords an excellent property, impregnation of paper for flexibility under elevated temperatures, coating of wire for use in high temperature applications and such other useful applications as required thermosetting resin compositions wherein thermal stability and thermal flexibility are desired. The resins of this invention have high reactivity as respects their capacity to cure when being crosslinked which makes them of value for use in those applications where quick curing is desirable. Such high reactivity is attributed to the special properties of the phenol-formaldehyde reaction product and the interpolymer combination which is used in the compositions of this invention.

The following examples are set forth to illustrate more clearly the principles and practices of this invention to one skilled in the art and they are not intended to be restrictive but merely to be illustrative of the invention herein contained. Unless otherwise stated herein, all parts and percentages are on a weight basis.

Example I

To 95 parts of an aqueous phenol-formaldehyde reaction product prepared by reacting 2.0 mols of formaldehyde per mol of phenol under alkaline conditions, add 5 parts of a 40% solution of the ammonium salt of a styrene/maleic anhydride/terpinolene interpolymer which styrene/maleic anhydride interpolymer has been prepared by the mass polymerization of a 1 molar portion of styrene, a 1 molar portion of a maleic anhydride half ester of butyl cellosolve (butyl cellosolve is the mono-n-butyl ester of ethylene glycol) in the presence of about 7 percent (based on styrene) of terpinolene as a molecular weight regulator, and one-half weight percent of benzoyl peroxide and one-half weight percent of ditertiary butyl peroxide as coinitiators (based on total weight of styrene). The ammonium salt of the styrene maleic anhydride interpolymer is prepared by first forming a water dispersion of the styrene/maleic anhydride interpolymer, and then adding ammonium hydroxide until the styrene maleic anhydride interpolymer is completely dissolved. The resulting liquid resin composition is a solution containing about 60 weight percent solids.

This resin is designated as I.

Example II

Example I is repeated except that 75 parts of the phenolformaldehyde resin are employed therein in place of the 95 parts and, correspondingly, 25 parts of the ammonium salt of the styrene/maleic anhydride/terpinolene interpolymer are employed in place of 5 parts thereof. The resulting liquid resin composition contains about 55 weight percent solids.

This resin is designated as II.

Example III

Example I is repeated except that 35 parts of the phenol formaldehyde resin are employed therein in place of the 95 parts thereof, and, correspondingly 65 parts of the ammonium salt of the styrene/maleic anhydride/terpinolene interpolymer are employed herein in place of the 5 parts thereof. The resulting liquid resin composition contains about 55 weight percent solids.

This resin is designated as III.

Example IV

Example II is repeated except that the styrene/maleic anhydride employed herein is one prepared by the mass polymerization reaction of 1 molar portion of styrene and 1 molar portion of maleic anhydride using about 1 weight percent dipentene as a specific molecular weight regulator. The resulting liquid resin composition contains about 55 weight percent solids.

This resin is designated as IV.

Example V

Example II is repeated except that in place of the 75 parts of the phenol-formaldehyde resin, 75 parts of a mixture of phenol-formaldehyde and dicyandiamide-formaldehyde reaction products are employed herein. This phenol-formaldehyde/dicyandiamide/formaldehyde reaction product is prepared in the manner described by Example I of U.S. Patent 3,004,941. The resulting liquid resin composition contains about 55 weight percent solids.

This resin is designated as V.

Example VI

To 50 parts of an aqueous phenol-formaldehyde reaction product prepared by reacting 2.0 mols of formaldehyde per mol of phenol under alkaline conditions is added 62.5 parts of a 40% aqueous solution of the ammonium salt of a styrene maleic anhydride terpinolene terpolymer. The styrene maleic anhydride terpolymer used is prepared by the mass polymerization of a one-molar portion of styrene and a one-molar portion of a maleic anhydride half ester employing 7 percent terpinolene as a molecular weight regulator and employing one-half weight percent of benzoyl peroxide and one-half weight percent of ditertiary butyl peroxide as coinitiators (based on total weight of styrene starting material). The ammonium salt of this styrene maleic anhydride half ester terpolymer is prepared by first forming a water dispersion of the styrene maleic anhydride half ester terpolymer, and then adding ammonium hydroxide in an amount sufficient to completely dissolve the terpolymer. This resulting liquid solution composition is an aqueous solution containing about 50 weight percent solids.

This resin is designated as VI.

Example VII

Each of the resin systems designated as I through VI above is molded as follows:

A sample of each resin is heated in an open vessel over a hotplate maintained at about 120° C. for a time sufficient to dehydrate same to dryness and advance the resin to a solid state but not crosslinked. The resulting dried cake is ground to a powder. 25 grams of this powder is then placed in a circular mold approximately 4 inches in diameter. Each such sample is heated in the closed mold at 170° C. for 15 minutes under a pressure of 400 p.s.i.g. The resulting resin disc is cooled and removed from the mold. Each resulting test disc is then cut into strips of 1″ x ½″ each having a thickness of 0.3″.

Example VIII

Each of the resin compositions of Examples I–IV is prepared as described in Example VII into cured polymer strips. The thermal flexibility of each cured resin sample is determined by measuring the glass transition temperature thereof. As a control, the glass transition temperature of a pure phenol-formaldehyde resin composition is also determined. The phenol-formaldehyde resin composition used for this purpose is prepared by the condensation reaction of 2.0 mols of formaldehyde per mol of phenol under aqueous alkaline conditions.

The glass transition temperatures of the test specimens are determined by plotting the logarithmic shear modulus vs. temperature in ° C. and is described in Mechanical Properties of Polymers by Dr. L. Nielsen, published 1961, Chapter 7, Dynamic Mechanical Testing. It is defined as that point on the curve where the slope of the curve has the greatest change. The actual test is conducted employing a heating chamber and a torsion pendulum to which the specimen is attached. The glass transition temperatures are as follows.

TABLE I

| Resin compositions: | Glass transition temperatures, ° C. |
|---|---|
| I | 230 |
| II | 220 |
| III | 190 |
| IV | 220 |
| V | 215 |
| VI | 200 |
| Phenol-formaldehyde—Infusible; greater than 260° C. | |

In general, the glass transition temperature is that temperature at which a resin sample begins to soften. Thus, this example clearly shows that the resin compositions of this invention have greater thermal flexibility, as determined by their glass transition temperatures, than a straight phenol-formaldehyde resin which is infusible and had a glass transition temperature in excess of 260° C. (e.g. the resin is excessively brittle). In general, the lower the glass transition temperature, the better the flexibility of the resin when exposed to the higher temperatures.

Example IX

The thermal stability of each of the resin compositions of Examples I–V is also determined by preparing test specimens in the same manner as in Example VI. The control phenol-formaldehyde resin as employed in Example VI is also employed herein to prepare a test specimen for purposes of comparison. The samples are weighed and are then exposed to a temperature of 260° C. for 300 hours. The samples are reweighed to determine their weight loss. The results are as follows:

TABLE II

| Resin composition: | Percent weight loss |
|---|---|
| I | 64 |
| II | 38 |
| III | 26 |
| IV | 38 |
| V | 37 |
| VI | 40 |
| Phenol-formaldehyde | 75 |

This example shows that with increasing amounts of the interpolymer, the thermal stability of a cured resin system is greatly increased. By the term thermal stability, reference is had to the percent loss in weight of a resin when subjected to elevated temperatures.

Those skilled in the art will appreciate that the resin compositions of this invention can be conventionally formulated with fillers and the like as for commercial purposes without departing from the spirit and scope of this invention.

What is claimed is:

1. A heat curable liquid resin concentrate containing in solution both a phenol-formaldehyde reaction product and a vinylidene monomer/maleic monomer/terpene monomer interpolymer, said terpene monomer having the formula:

wherein R is a cyclic organic radical to which =CR'R" is joined at a carbon atom of an alicyclic ring having at least 4 members, and wherein R' and R" are independently selected from the group consisting of hydrogen and an alkyl radical, the relative weight proportion of said phenol-formaldehyde reaction product of the total combined weight of said phenol-formaldehyde reaction product and said interpolymer being from about 98 to 2 percent, and correspondingly, the relative weight proportion of said interpolymer of said total combined weight being from about 2 to 98 percent, said total combined weight comprising at least about 25 weight percent of the total concentrate weight but not more thereof than is sufficient to make said concentrate free flowing.

2. The concentrate of claim 1 wherein said phenol-formaldehyde reaction product is the reaction product of from about 0.5 to 3.5 mols of formaldehyde per mol of phenol under alkaline or acidic conditions.

3. The concentrate of claim 1 wherein said phenol-formaldehyde reaction product is one which is modified with dicyandiamide or urea.

4. The concentrate of claim 1 wherein said interpolymer is prepared by mass polymerization with a free radical generating polymerization initiator of from about 1 to 2 molar portions of a vinylidene monomer per molar portion of a maleic monomer in the presence of at least about 0.5 weight percent (based on total weight of said vinylidene monomer) of said terpene monomer.

5. The concentrate of claim 4 wherein said terpene monomer is terpinolene.

6. The concentrate of claim 4 wherein said vinylidene monomer is styrene.

7. The concentrate of claim 4 wherein said maleic monomer is maleic anhydride.

8. The concentrate of claim 4 wherein said maleic monomer is a maleic anhydride half ester.

9. A heat curable resin composition comprising a mixture of from about 98 to 2 weight percent of a phenol-formaldehyde reaction product, and, correspondingly, from about 2 to 98 weight percent of a vinylidene monomer/maleic monomer/terpene monomer interpolymer, said terpene monomer having the formula:

wherein R is a cyclic organic radical to which =CR'R" is joined at a carbon atom of an alicyclic ring having at least 4 members, and wherein R' and R" are independently selected from the group consisting of hydrogen and an alkyl radical.

10. The composition of claim 9 wherein said phenol-formaldehyde reaction product is the reaction product of from about 0.5 to 3.5 mols of formaldehyde per mol of phenol under alkaline or acidic conditions.

11. The composition of claim 9 wherein said phenol-formaldehyde reaction product is one which is modified with dicyandiamide or urea.

12. The composition of claim 9 wherein said interpolymer is prepared by mass polymerization with a free radical generating polymerization initiator of from about 1 to 2 molar portions of a vinylidene monomer per molar portion of a maleic monomer in the presence of at least about 0.5 weight percent (based on total weight of said vinylidene monomer) of said terpene monomer.

13. The composition of claim 12 wherein said terpene monomer is terpinolene.

14. The composition of claim 12 wherein said vinylidene monomer is styrene.

15. The composition of claim 12 wherein said maleic monomer is maleic anhydride.

16. The composition of claim 12 wherein said maleic monomer is a maleic anhydride half ester.

17. A crosslinked resin product produced by heat curing a composition of claim 9.

18. A crosslinked resin product produced by heat curing a composition of claim 10.

19. A crosslinked resin product produced by heat curing a composition of claim 11.

20. A crosslinked resin product produced by heat curing a composition of claim 11.

21. A crosslinked resin product produced by heat curing a composition of claim 13.

22. A crosslinked resin product produced by heat curing a composition of claim 14.

23. A crosslinked resin product produced by heat curing a composition of claim 15.

24. A crosslinked resin product producted by heat curing a composition of claim 16.

References Cited

UNITED STATES PATENTS

| 2,383,399 | 8/1945 | Lundquist | 260—78.5 |
| 2,469,408 | 5/1949 | Powers et al. | 260—848 |
| 2,708,645 | 5/1955 | Norman | 260—855 |
| 2,760,945 | 8/1956 | Bodenschatz et al. | 260—855 |
| 3,004,941 | 10/1961 | Mestdagh et al. | 260—840 |
| 3,196,120 | 7/1965 | McLaughlin et al. | 260—855 |
| 3,223,751 | 12/1965 | Sellet | 260—855 |

OTHER REFERENCES

Boundy et al.: Styrene its polymers, copolymers and derivatives, 1952, Reinhold, p. 844.

MURRAY TILLMAN, *Primary Examiner.*

J. C. BLEUTGE, *Assistant Examiner.*